A. M. O'QUINN.
SIZER AND GRADER.
APPLICATION FILED MAY 31, 1917.
1,249,179.
Patented Dec. 4, 1917.
4 SHEETS—SHEET 1.
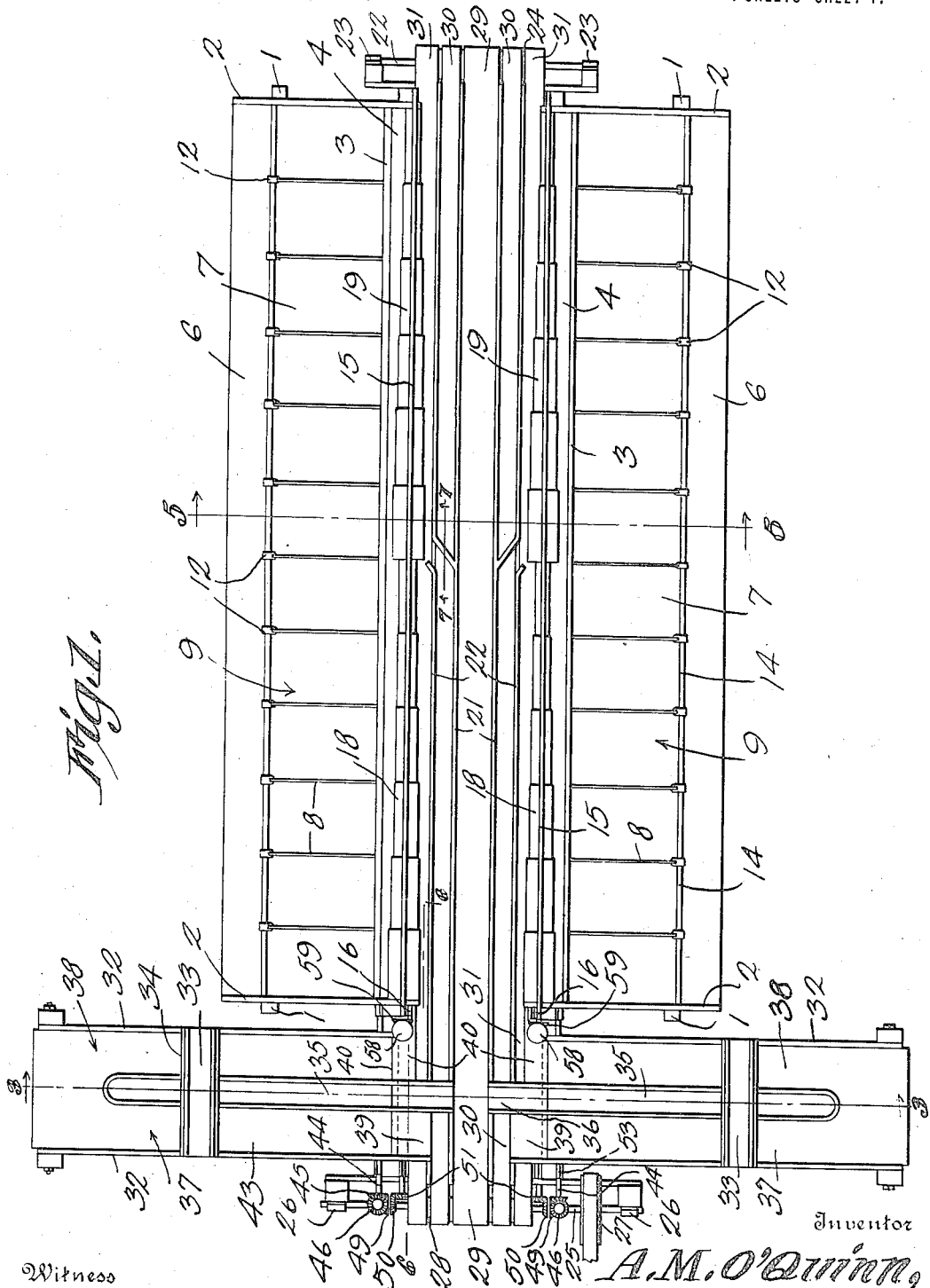

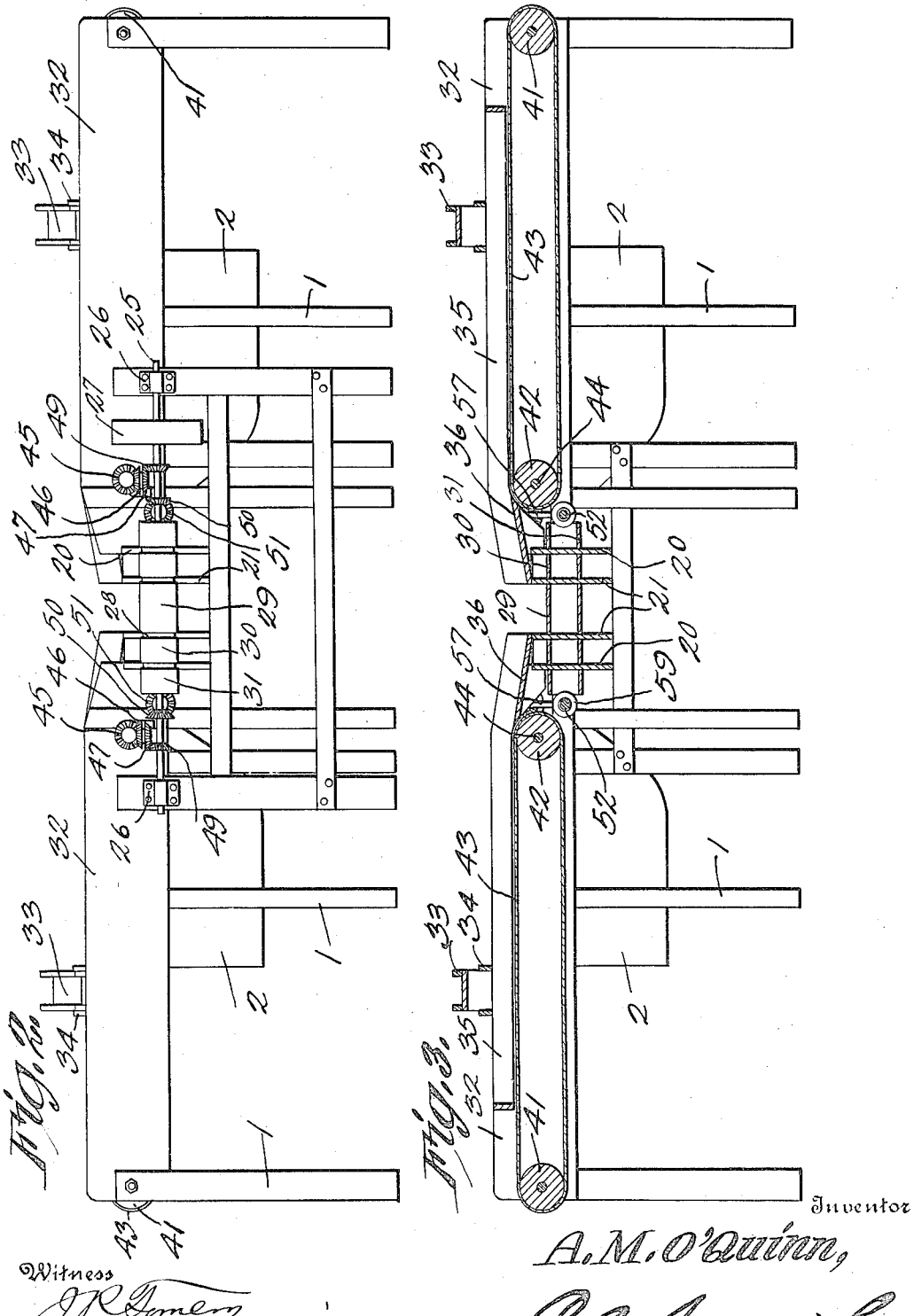

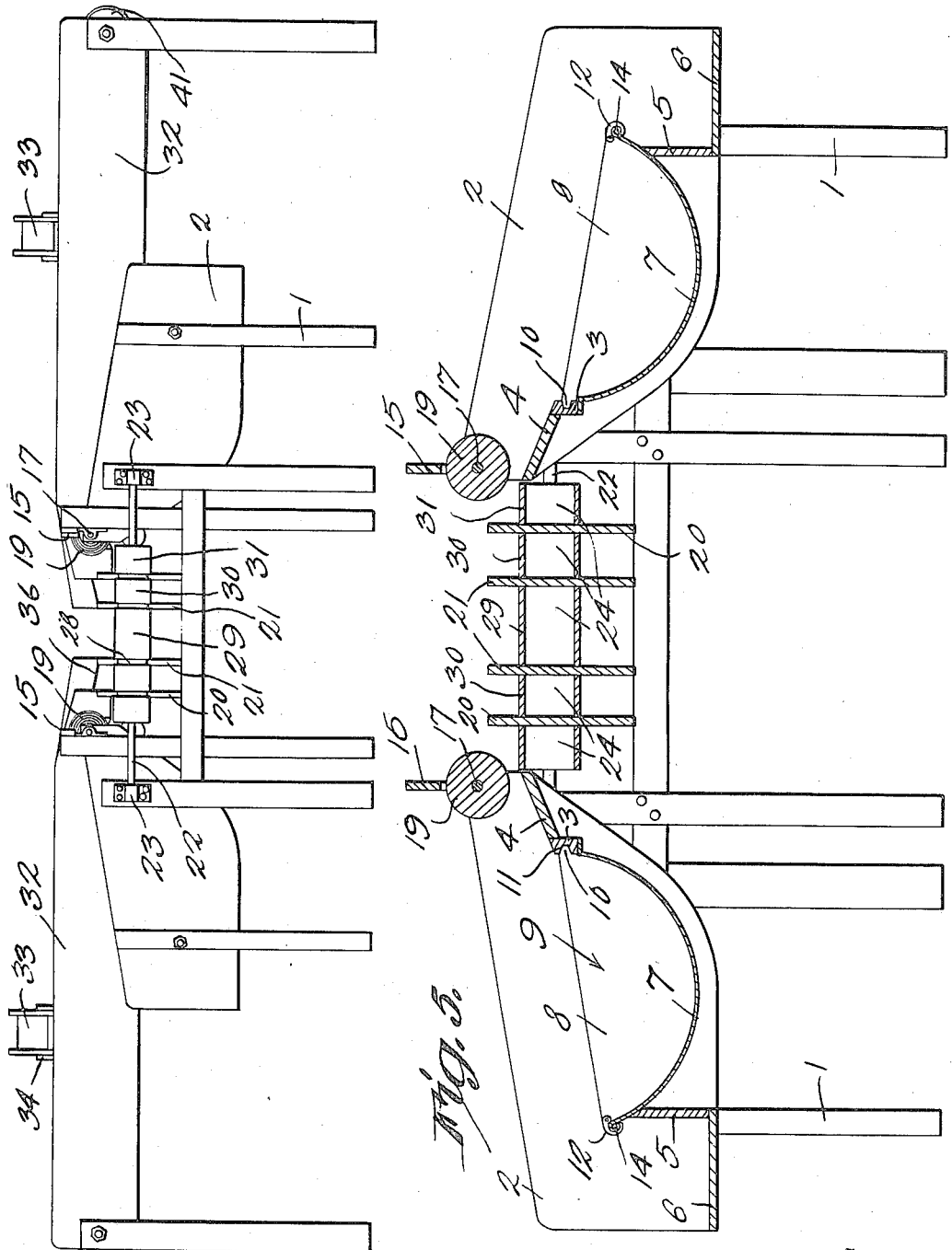

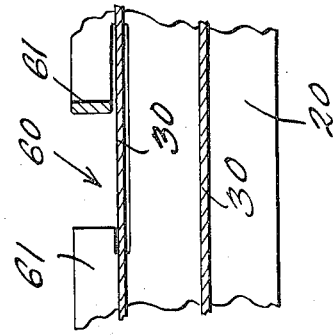
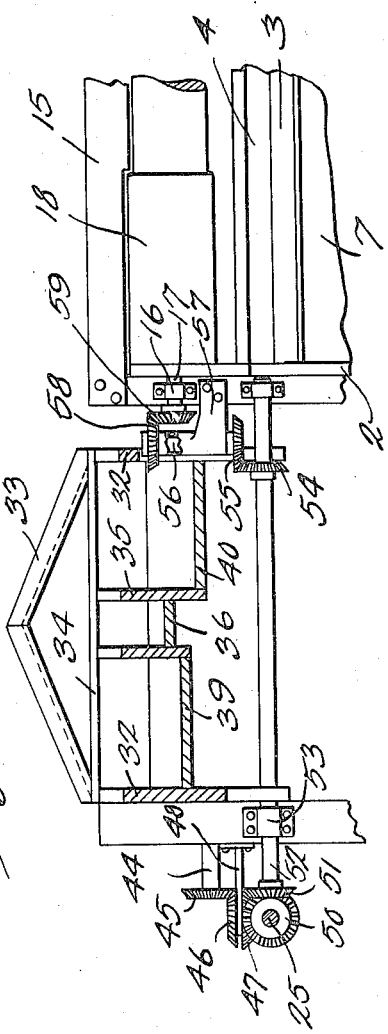
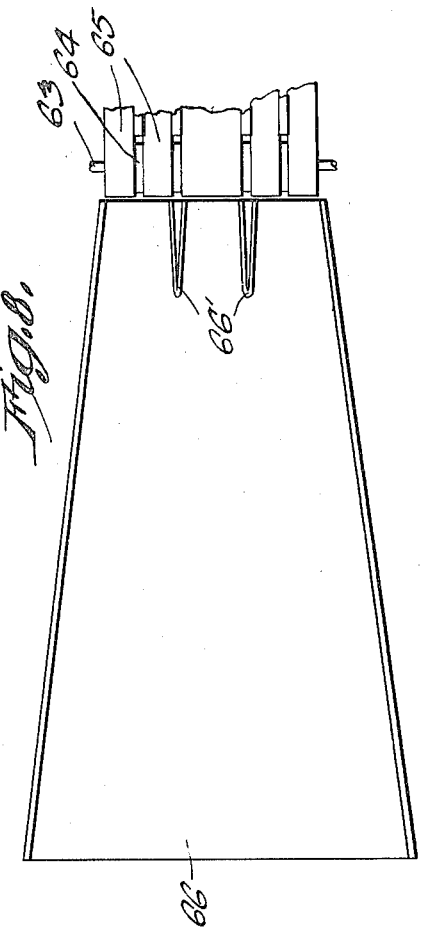

UNITED STATES PATENT OFFICE.

ARTHUR MORELAND O'QUINN, OF MIAMI, FLORIDA.

SIZER AND GRADER.

1,249,179.

Specification of Letters Patent.

Patented Dec. 4, 1917.

Application filed May 31, 1917. Serial No. 171,982.

*To all whom it may concern:*

Be it known that I, ARTHUR M. O'QUINN, a citizen of the United States, residing at Miami, in the county of Dade and State of Florida, have invented a new and useful Sizer and Grader, of which the following is a specification.

The device forming the subject matter of this application is a fruit and vegetable grader, and the invention aims to provide novel means whereby with a minimum expenditure of labor, fruit and vegetables may be graded according to size and quality.

Another object of the invention is to provide novel means whereby the grading rolls will be prevented from being overloaded, novel means being supplied for distributing the material to be graded between the rollers.

Another object of the invention is to provide novel means whereby some of the material may be carried through the machine without being graded as described.

It is within the province of the disclosure to improve the means whereby the various movable elements are supported and driven.

The invention contemplates the general improvement of structures of that type to which the present disclosure appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in top plan, a grader constructed in accordance with the present invention;

Fig. 2 is an elevation showing the forward end of the grader;

Fig. 3 is a section taken approximately on the line 3—3 of Fig. 1;

Fig. 4 is an elevation showing the rear end of the grader;

Fig. 5 is a cross section taken approximately on the line 5—5 of Fig. 1;

Fig. 6 is a fragmental longitudinal section taken approximately on the line 6—6 of Fig. 1;

Fig. 7 is a fragmental longitudinal section taken approximately on the line 7—7 of Fig. 1;

Fig. 8 is a top plan showing a slight modification in the invention.

In carrying out the invention as shown in Figs. 1 to 7 both inclusive, there is provided a supporting frame 1 which need not be described in all of its details, since this part of the structure may be built as desired. Mounted on the supporting structure 1 are end plates 2, spaced apart at any desired distance, longitudinally of the machine, there being two pairs of end plates 2, since the machine preferably discharges the graded fruit in opposite directions. Extended between the end plates 2 is a longitudinal beam 3, and a chute board 4 extends between the plates 2, the board 4 slanting downwardly and outwardly to the longitudinal beam 3. Extended between the end plates 2 at each side of the machine are longitudinal plates 5. Disposed at the lower edge of each plate 5 and extended between the end plates 2 is a platform 6. The parts 3—5 at each side of the machine are connected by a trough 7 within which are disposed partitions 8 defining compartments 9. It is contemplated that the partitions 8 may be adjusted longitudinally of the troughs 7, to vary the size of the compartments 9, and with this end in view, each partition 8 is supplied at its inner end with a lug 10 received removably in a recess 11 formed in the beam 3. The outer ends of the partitions 8 carry clips 12 of any desired form, engaging a bead 14 formed at the outer edge of the trough 7. Cleaning strips 15 are disposed above the inclined chute boards 4 and are supported on the framework 1.

The frame 1 carries bearings 16 in which are journaled shafts 17 carrying grading rollers 18 and 19, the rollers 19 being located to the rear of the rollers 18, and the rollers 18 and 19 lying beneath the strips 15 at opposite sides of the machine, a construction which Fig. 5 will make manifest, when compared with Fig. 1. The grading rollers 18 and 19 may be of any desired form, but preferably are larger at one end than at the other, as is usual. The rollers 18 and 19 operate above the outwardly and downwardly inclined chute boards 4.

Disposed between the grading rollers 18 and 19 at the opposite sides of the machine and supported on the frame 1 are outer division plates 20 and inner division plates 21. An idle shaft 22 is journaled in bearings 23 at the rear end of the frame 1 and extends transversely of the frame. The idle shaft 22 carries pulleys 24. A power shaft 25 is journaled in bearings 26 carried by the forward end of the frame 1, the power shaft being driven by a pulley 27 or in any other suitable manner. Pulleys 28 are mounted on the power shaft 25. Around the pulleys 28 and 24 is trained a central belt 29 operating between the division plates 21, intermediate belts 30 operating between the division plates 21 and 20, and outer belts 31 operating exteriorly of the division plates 20, these belts being employed for advancing the material to be graded, in a manner which will be set forth hereafter.

The invention comprises a pair of transverse receivers extended in opposite directions and located adjacent the forward end of the machine, each of these receivers comprising side plates 32 supported on the frame 1. Disposed transversely of the machine and located between the side plates 32 are division troughs 35 which are open at the bottom. The division troughs 35 are supported on tie rods 34 connecting the side plates 32. Disposed between the tie rods 34 and upheld on the plates 32 are chutes 33 which discharge in opposite directions, transversely of the side plates 32 of the lateral receivers. Each division trough 35 is provided at its inner end with an extension 36, the extensions 36 discharging adjacent the longitudinal center of the machine, on the central trundler belt 29. The division troughs 35 operate each of the lateral receivers into a runway 37 and a runway 38. A lip 39 carried by one of the side plates 32 of the adjacent side wall of the trough 35 receives the fruit from the runway 37 and discharges the fruit on the intermediate conveyer belt 30. A lip 40, similarly supported, receives the fruit from the runway 38 and discharges the fruit on the outer conveyer belt 31.

Journaled between the side plates 32 at the outer ends thereof is a roller 41. A roller 42 is journaled between the side plates 32 at the inner ends thereof. About the rollers 41 and 42 is trained a conveyer belt 43 operating between the side plates 32, the construction above described being duplicated, of course, upon each side of the machine, reference being had to Fig. 1 for a general lay-out of the structure alluded to. The rollers 42, which are power-driven, are carried by shafts 44 journaled in the side plates 32 and provided with beveled pinions 45 meshing into beveled pinions 46 connected with beveled pinions 47, the pinions 46 and 47 being journaled in brackets 48 carried by the framework of the machine. The beveled pinions 47 mesh into beveled pinions 49 carried by the power shaft 25. The power shaft 25 carries beveled pinions 50 meshing into beveled pinions 51 carried by shafts 52 extended longitudinally of the machine and journaled in bearings 53 on the framework 1, as Fig. 6 will clearly disclose. The shafts 52 are provided with beveled pinions 54 meshing into beveled pinions 55 carried by the lower ends of shafts 56 journaled in bearing brackets 57 on the framework of the machine, the upper ends of the shafts 56 being supplied with beveled pinions 58 meshing into beveled pinions 59 on the forward ends of the shafts 17 which carry the grading rollers 18 and 19.

Adjacent the forward ends of the grading rollers 19, the outer division plates 20 are supplied with openings 60. Deflecting partitions 61 disposed acutely with respect to the longitudinal center of the machine connect the plates 20 and 21, near to the openings 60. Adjacent the openings 60, the division plates 20 are provided with outwardly and laterally inclined lips 62.

The drives are as follows. When the shaft 25 is rotated by the pulley 25 or its equivalent, the various belts 29, 30 and 31 are actuated to advance the fruit. From the power shaft 25, motion is transmitted to the conveyer belts 43, which receive the fruit initially, by a gear train comprising the beveled pinions 49, the beleved pinions 47 and 46, the beveled pinions 45 and the shafts 44 of the rollers 42. From the power shaft 25, motion is transmitted by way of the beveled pinions 50 and 51, the shafts 52, the beveled pinions 54 and 55, the shafts 56, and the beveled pinions 58 and 59 to the shafts 17 which carry the grading rollers 18 and 19.

In operation, operators stand upon each side of the lateral receivers which embody side plates 32 and attendant parts. The fruit is dumped onto the outer ends of the conveyer belts 43 and is passed thereby toward the longitudinal center of the machine. As the fruit is advanced, the operators pick out the trash and the rotten peaches, assuming that peaches are being graded, and place this material in the inclined chutes 33 which discharge downwardly into baskets (not shown) placed at each side of the lateral receivers comprising the plates 32 and attendant parts. The peaches which are sound but not of sufficiently high grade to warrant their being separated according to size, are picked out by the operators, and placed within the division troughs 35. The belts 43 advance the peaches in the troughs 35 and the peaches, traversing the extensions 36, are delivered onto the central belt 29, which carries the peaches longitudinally of the machine to the rear end thereof or to some other suitable place of reception. In this way, the peaches which are sound but not worthy of being separated according to size are cared for without grading.

The peaches which may be denominated as "fancy," are carried by the belts 43 into the runways 37 and 38 which are on opposite sides of the division trough 35. The peaches in the runway 38 are received by the lips 40 and pass onto the outer belts 31. The belts 31 carry the peaches longitudinally of the rollers 18, which separate the peaches according to size, the peaches rolling downwardly and outwardly across the chute boards 5 into the receptacles 9. Shipping boxes (not shown) may be placed on the platforms 6 and operators move the peaches out of the compartments 9 and place them in the shipping boxes.

The peaches which traverse the runways 37 are received by the lips 39, which are longer than the lips 40 and are conveyed onto the intermediate belts 30. The belts 30 advance the peaches until the peaches encounter the deflecting partitions 61, whereupon the peaches are carried laterally and are received by the rear ends of the inner belts 31, the peaches then being graded by the rollers 19 as described hereinbefore in connection with the rollers 18. Owing to the construction above described, the rollers 18 are never overloaded, and the peaches are distributed fairly and evenly between the rollers 18 and 19. The strips 15 serve to keep the rollers 18 and 19 clean and they prevent the peaches on the outer belts 31 from jumping accidentally over the rollers 18 and 19.

Although it is desirable to employ the lateral receivers comprising the plates 32 and attendant parts such a construction is not mandatory. In Fig. 8 of the drawings, the power shaft appears at 63 and carries rollers 64 about which the longitudinal conveyer belts 65 are trained. A table 66, extended longitudinally of the machine, discharges onto the conveyer belts 65 and is provided adjacent its inner end with partitions 66' effecting the necessary separation.

In the embodiment of the invention shown, there are but two of the grading rollers 18—19 on each of the shafts 17, but it is to be understood that the number of grading rollers carried by the shafts may be increased, this being a matter of mere duplication, lying well within the skill of a mechanic, and meriting no specific delineation.

Having thus described the invention, what is claimed is:—

1. A device of the class described embodying alined forward and rear grading rollers; an outer conveyer traversing both rollers throughout their lengths; an intermediate conveyer traversing the rollers throughout their lengths; means for discharging material onto the conveyers; and means for deflecting the material from the intermediate conveyer to the outer conveyer adjacent the forward end of the rear grading roller.

2. A device of the type described embodying alined forward and rear grading rollers; an outer conveyer traversing both rollers throughout their lengths; an intermediate conveyer traversing the rollers throughout their lengths; an inner conveyer traversing the rollers throughout their lengths; a partition disposed between the inner conveyer and the intermediate conveyer; means for discharging material onto the conveyers; and means for deflecting the material from the intermediate conveyer to the outer conveyer, adjacent the forward end of the rear grading roller.

3. A device of the type described embodying forward and rear alined grading rollers; an outer conveyer traversing both rollers throughout their lengths; an intermediate conveyer traversing both rollers throughout their lengths; an inner conveyer traversing both rollers throughout their lengths; means for deflecting the material from the intermediate conveyer to the outer conveyer adjacent the forward end of the rear grading roller; a lateral receiver; a conveyer traversing the lateral receiver; a trough in the receiver, above the last specified conveyer and discharging onto the inner conveyer; and means for delivering the material from the receiver, on opposite sides of the trough, on the outer conveyer and on the intermediate conveyer respectively.

In testimony that I claim the foregoing as my own, I have hereto affixed my signature in the presence of two witnesses.

ARTHUR MORELAND O'QUINN.

Witnesses:
W. A. HEARN,
J. E. JOHNSON.